(12) United States Patent
Kerik

(10) Patent No.: US 11,425,869 B2
(45) Date of Patent: Aug. 30, 2022

(54) TREE PROCESSING SYSTEMS

(71) Applicants: Les Alfred Kerik, Alberta (CA); Robert Stegmeier, Alberta (CA)

(72) Inventor: Les Alfred Kerik, Alberta (CA)

(73) Assignees: Les Alfred Kerik, Alberta (CA); Robert Stegmeier, Alberta (CA)

( * ) Notice: Subject to any disclaimer, the term of this patent is extended or adjusted under 35 U.S.C. 154(b) by 0 days.

(21) Appl. No.: 16/300,932

(22) PCT Filed: May 10, 2017

(86) PCT No.: PCT/CA2017/050565
§ 371 (c)(1),
(2) Date: Nov. 12, 2018

(87) PCT Pub. No.: WO2017/193215
PCT Pub. Date: Nov. 16, 2017

(65) Prior Publication Data
US 2019/0159410 A1  May 30, 2019

Related U.S. Application Data

(60) Provisional application No. 62/335,306, filed on May 12, 2016.

(51) Int. Cl.
*A01G 23/083* (2006.01)
*A01G 23/097* (2006.01)
*A01G 23/093* (2006.01)

(52) U.S. Cl.
CPC ......... *A01G 23/083* (2013.01); *A01G 23/097* (2013.01); *A01G 23/093* (2013.01)

(58) Field of Classification Search
CPC .... A01G 23/08; A01G 23/083; A01G 23/091; A01G 23/093; A01G 23/095; A01G 23/097; B27L 1/00; B27L 1/005; B27L 1/10
See application file for complete search history.

(56) References Cited

U.S. PATENT DOCUMENTS

| 3,889,729 | A |   | 6/1975 | Pinomaki |
| 4,823,849 | A |   | 4/1989 | Unosen |
| 5,865,229 | A |   | 2/1999 | Unosen |
| 6,123,124 | A | * | 9/2000 | Naud ................... A01G 23/081 144/335 |

(Continued)

FOREIGN PATENT DOCUMENTS

| CA | 1318222 C | 5/1993 |
| CA | 2212365 C | 5/2000 |

*Primary Examiner* — Matthew Katcoff
(74) *Attorney, Agent, or Firm* — St. Onge Steward Johnston and Reens LLC

(57) ABSTRACT

The present invention relates generally to an improved tree processing system enabling efficient, reliable and accurate processing of harvested trees. The system includes a grabbing head having first grabbing arms and a delimbing head having second grabbing arms. The first and second grabbing arms are mounted on a boom system and can be activated to grab the tree stem of a harvested tree. When grabbed, the boom system can be selectively extended or retracted to effect delimbining of a felled tree. Each of the delimbing head and grabbing head includes saws allowing an operator to selectively activate one or both saws to cut a length of timber.

16 Claims, 13 Drawing Sheets

(56) References Cited

U.S. PATENT DOCUMENTS

| | | | | |
|---|---|---|---|---|
| 6,405,770 B1* | 6/2002 | Camirand | ............ | A01G 23/097 |
| | | | | 144/24.13 |
| 6,550,506 B1 | 4/2003 | Levesque et al. | | |
| 9,095,101 B2* | 8/2015 | Lajoie | .................. | A01G 23/091 |
| 9,554,524 B2* | 1/2017 | Swinyard | ............. | A01G 23/083 |
| 9,877,437 B2* | 1/2018 | Neumann | ............ | A01G 23/081 |
| 10,238,045 B2* | 3/2019 | Boys | .................... | A01G 23/083 |
| 2010/0230008 A1* | 9/2010 | Kondo | ................. | A01G 23/083 |
| | | | | 144/338 |
| 2012/0018043 A1* | 1/2012 | Keskinen | ............. | A01G 23/083 |
| | | | | 144/34.1 |
| 2013/0284317 A1* | 10/2013 | Cudoc | ..................... | B27B 31/00 |
| | | | | 144/343 |
| 2015/0144225 A1* | 5/2015 | Stulen | ....................... | B27L 1/12 |
| | | | | 144/208.91 |

* cited by examiner

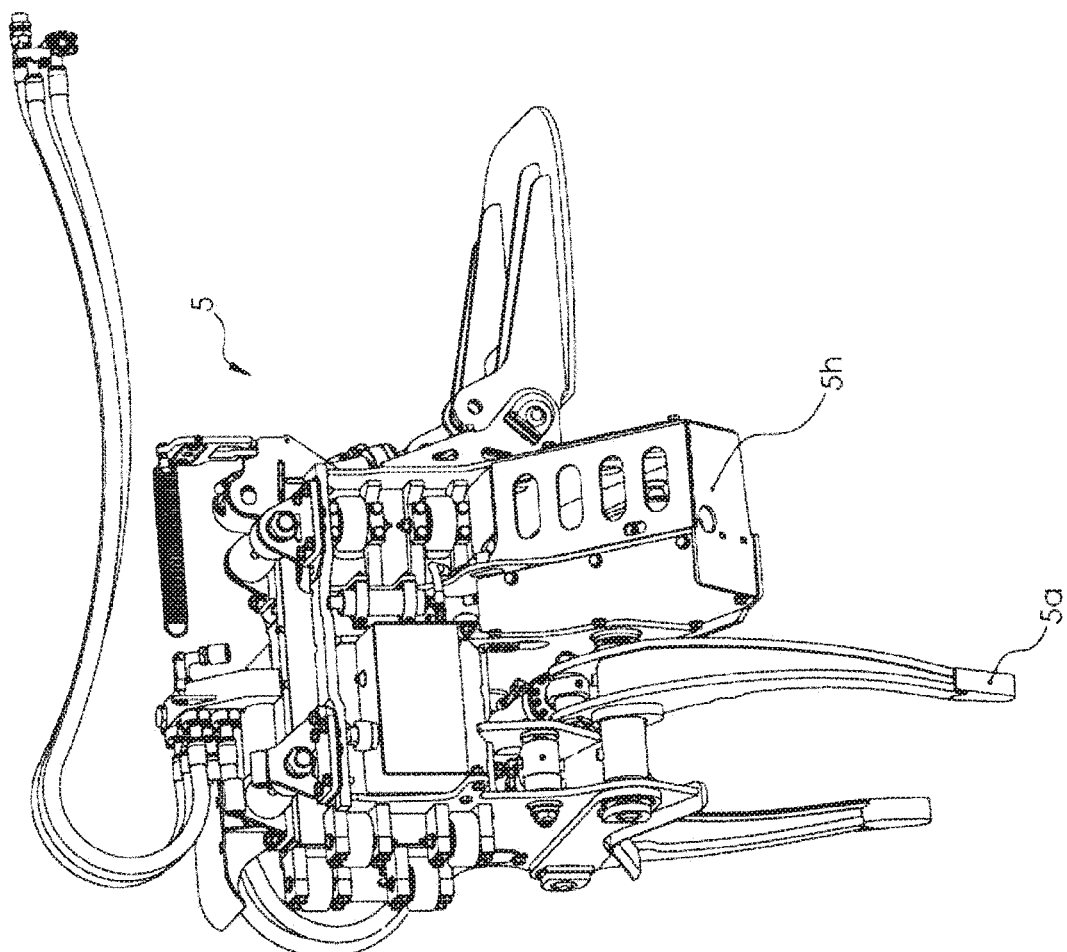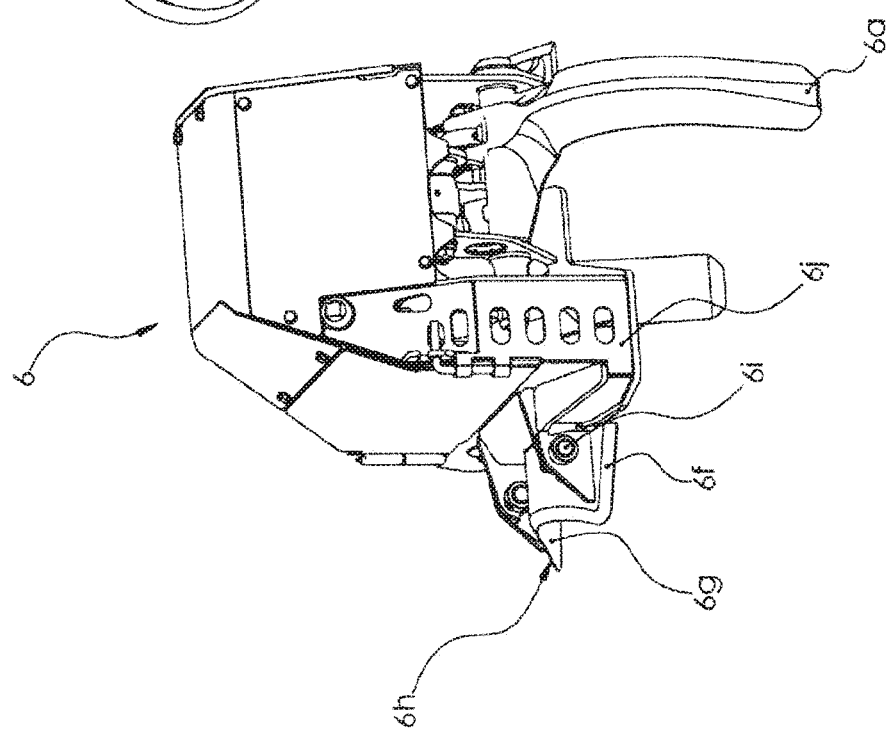
FIGURE 5

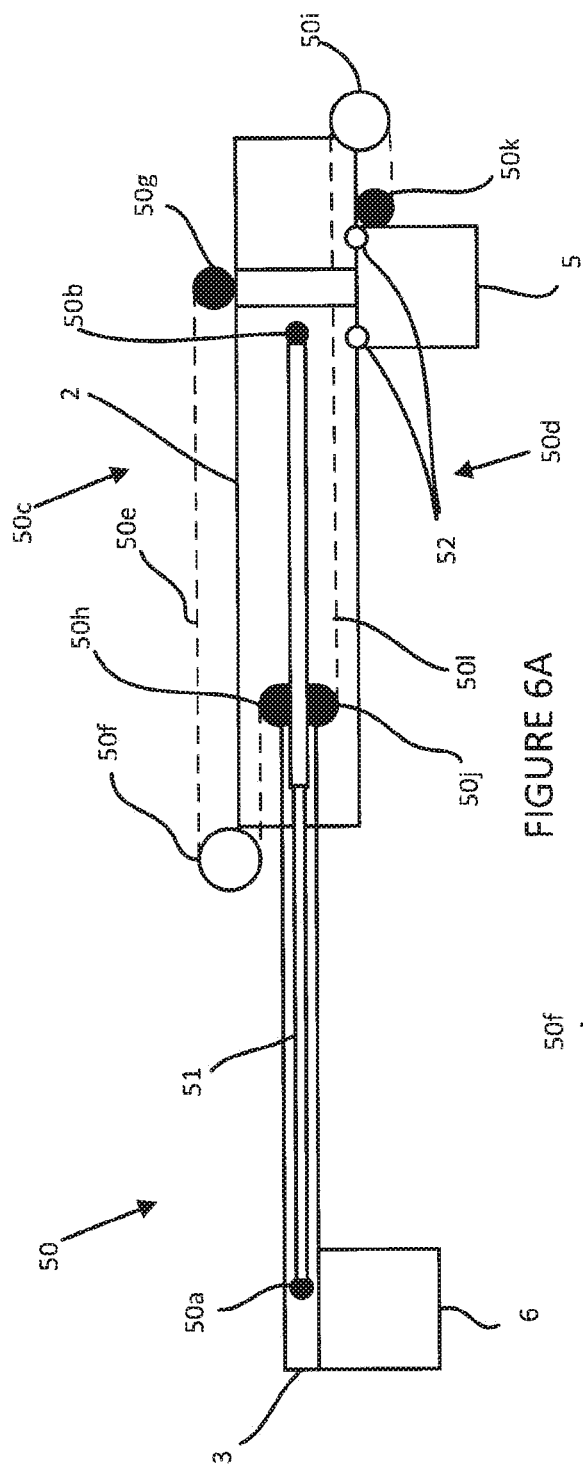
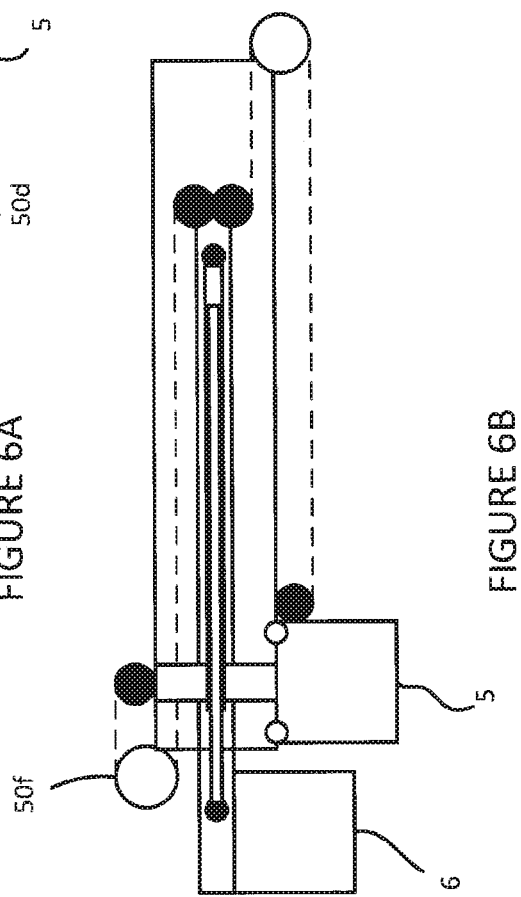
FIGURE 6A
FIGURE 6B

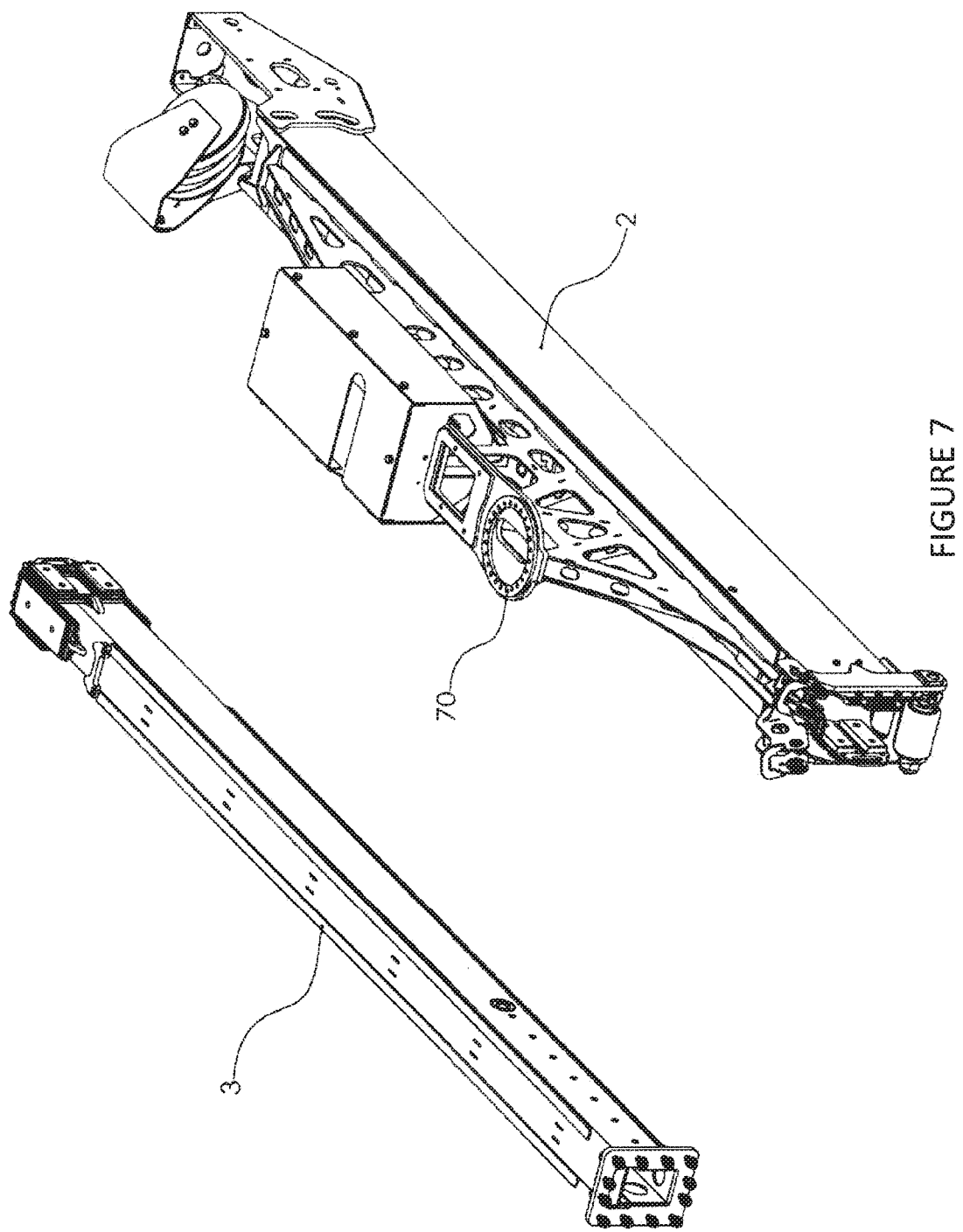

TREE PROCESSING SYSTEMS

FIELD OF THE INVENTION

The present invention relates generally to an improved tree processing system enabling efficient, reliable and accurate processing of harvested trees.

BACKGROUND OF THE INVENTION

In the lumber industry, various types of tree processing equipment enabling the delimbing and section cutting of harvested trees are known. Generally, after a tree has been felled or harvested, tree processing equipment is used to grab, delimb, and cut and stack the harvested lumber for subsequent transport from the stacking area. Often, current tree processing equipment is designed to be operatively mounted on the arm of an excavator or other heavy equipment that enables an operator to move across a forest floor to collect and process harvested trees. In the context of this description, the terms "processing" and "processor" refer to the process and the equipment used for delimbing and cutting of tree stems to a desired length.

Typical tree processing equipment includes a processing head that may be linearly moved with respect to a tree stem that breaks and/or cuts off the outwardly projecting branches of the tree as the processing head is moved with respect to tree stem. After stripping/cutting off the branches, the tree stem is usually cut to a desired length.

In the processing of felled trees, it is desirable that minimal amounts of wood fiber are damaged and/or wasted as a result of the processing process. That is, an operator who is ultimately delivering cut trees (timber) to a mill, wants to ensure that minimal amounts of wood are rejected and/or wants to ensure a high price for their timber and otherwise minimize factors that may cause the mill to impose a price-reduction due to lower quality timber. For example, factors that may reduce the price paid for timber include excessive fiber damage along the length of the stripped trees, damaged ends and/or timber of an improper length.

Further, it is also known that the environment in which a tree harvester operates is a harsh environment given where and how such systems must operate. These operating conditions include:

a. remote logging sites that are accessed via rough roads;
b. rugged terrain that can include many terrain features including steep slopes and swamps, as well as many different ground surfaces including sand, rocks and boulders;
c. extremes in environmental temperatures in all seasons;
d. extremes in precipitation;
e. extreme performance requirements in terms of loads including complex and variable mechanical loads; and,
f. complex mechanical operations that are repeated many times.

As such, a tree processor is ideally designed to enable reliable operation under these conditions while providing a high level of performance and throughput. That is, a tree processor will ideally minimize the time and costs associated with maintenance whilst it is being operated in a remote location. In other words, fundamentally it is desirable that the machine operates reliably over the course of an operating period and that the maintenance schedule, namely the time between maintenance overhauls is as long as is reasonably possible due to the time and cost of accessing a remote site and the costs of both scheduled and unscheduled downtime.

From the production standpoint, it is also desirable that a tree processor is able to operate as quickly as possible and that the processing throughput is as high as possible, in order to increase the production and otherwise meet the specifications of a specific order. Further, it is desirable that the tree processor is reliable in terms of minimizing damage to timber whilst consistently cutting timber to desired lengths, all of which will contribute to the profitability of the producer.

As noted above, while various tree processors have been utilized in the past, there continues to be a need for tree processor systems that improve both the performance and maintenance performance of tree processors.

In particular, there has been a need for tree processors having improved processing speeds and reliability while minimizing damage to the processed timber.

SUMMARY OF THE INVENTION

In accordance with the invention, there is provided an apparatus for processing harvested trees comprising: a grabbing head having first grabbing arms and a delimbing head having second grabbing arms, the first and second grabbing arms independently operable for grabbing the tree stem of a harvested tree, the grabbing head and delimbing head operatively mounted on a boom system enabling linear extension and retraction of the grabbing head with respect to the delimbing head and wherein the delimbing head includes a first saw system and the grabbing head includes a second saw system, the first and second saw systems independently operable to cut through a tree stem when a tree stem is held by both or either of the first and second grabbing arms.

In one embodiment, the apparatus includes an indexing plate pivotally connected to the boom system behind the grabbing head, the indexing plate operable between a first retracted position and a second deployed position, wherein in the deployed position, the indexing plate provides a fixed surface against which one or more tree stems may be abutted during operation.

In various embodiments, the first grabbing arms include a dual knife blade system and/or the second grabbing arms include a dual knife blade system.

In one embodiment, the boom system includes a delimbing head boom and grabbing head boom, the delimbing head boom and grabbing head boom telescopically engaged with respect to one another, the boom system further including a dual chain drive system operatively connected to the delimbing head boom and grabbing head boom enabling telescopic extension and retraction of the delimbing head boom and grabbing head boom with respect to one other, the chain drive further including a pivoting equalizer beam mounted to the boom system.

In another embodiment, the boom system includes a mounting and rotation system comprising a swivel bearing system for rotational connection of the boom system to carrying system, the mounting and rotation system including a hydraulic motor and drive gear and the swivel bearing system including a driven gear operatively connected to the drive gear by a belt or chain.

In one embodiment, the delimbing head includes a delimbing knife pivotally connected to the forward end of the delimbing head.

In one embodiment, the apparatus further includes an hydraulic drive and control system, the hydraulic drive and control system having at least two modes of operation including a full force mode and a full speed mode wherein full force mode extends the boom system with a higher force and a slower speed relative to the speed and force of full speed mode.

In yet another embodiment, the apparatus includes a first optical measuring system operatively connected to the boom system for measuring the linear displacement of the boom system, the first optical measuring system operatively connected to the hydraulic drive and control system for displaying the linear displacement of the boom system during operation.

In yet another embodiment, the apparatus includes a second optical measurement system operatively connected to one or more of the grabbing head and delimbing head for measuring the arcuate movement of the first and/or second grabbing arms relative to the grabbing head and/or delimbing head for determining the diameter of a felled tree when the first or second grabbing arms are engaged against a felled tree.

In another aspect, the invention provides a method of operating a tree processor as described as described above including the steps of enabling an operator to: a) align the boom system in a direction parallel to a felled tree; b) open the first and second grabbing arms; c) independently tighten the first and second grabbing arms around the felled tree wherein the first grabbing arms firmly grasp the felled tree; and, d) advance the delimbing head over the felled tree in a direction to enable the second grabbing arms to delimb the felled tree.

In one embodiment, the apparatus enables an operator to selectively and independently activate the first and second saw systems to cut a delimbed tree at the position of the grabbing or delimbing head or both.

In one embodiment, the apparatus enables an operator to tighten the second grabbing arms around the felled tree and loosen the first grabbing arms and advance the grabbing head towards the delimbing head prior to activation of the first or second saw systems.

In one embodiment, the apparatus enables an operator to selectively choose a mode of operation during boom extension including a full force mode or a full speed mode wherein full force mode extends the boom system with a higher force and a slower speed relative to the speed and force of full speed mode.

BRIEF DESCRIPTION OF THE DRAWINGS

Embodiments of the invention are described with reference to the attached Figures, wherein:

FIG. 5 is a perspective view of a rear processing head and forward processing head in accordance with one embodiment of the invention.

FIGS. 6A and 6B are schematic diagrams showing the process by which the inner and outer booms and forward and rear processing heads move with respect to each other in accordance with one embodiment of the invention.

FIG. 7 is a perspective view of the inner and outer booms of the tree processor in accordance with the invention.

DETAILED DESCRIPTION

Figure 1:
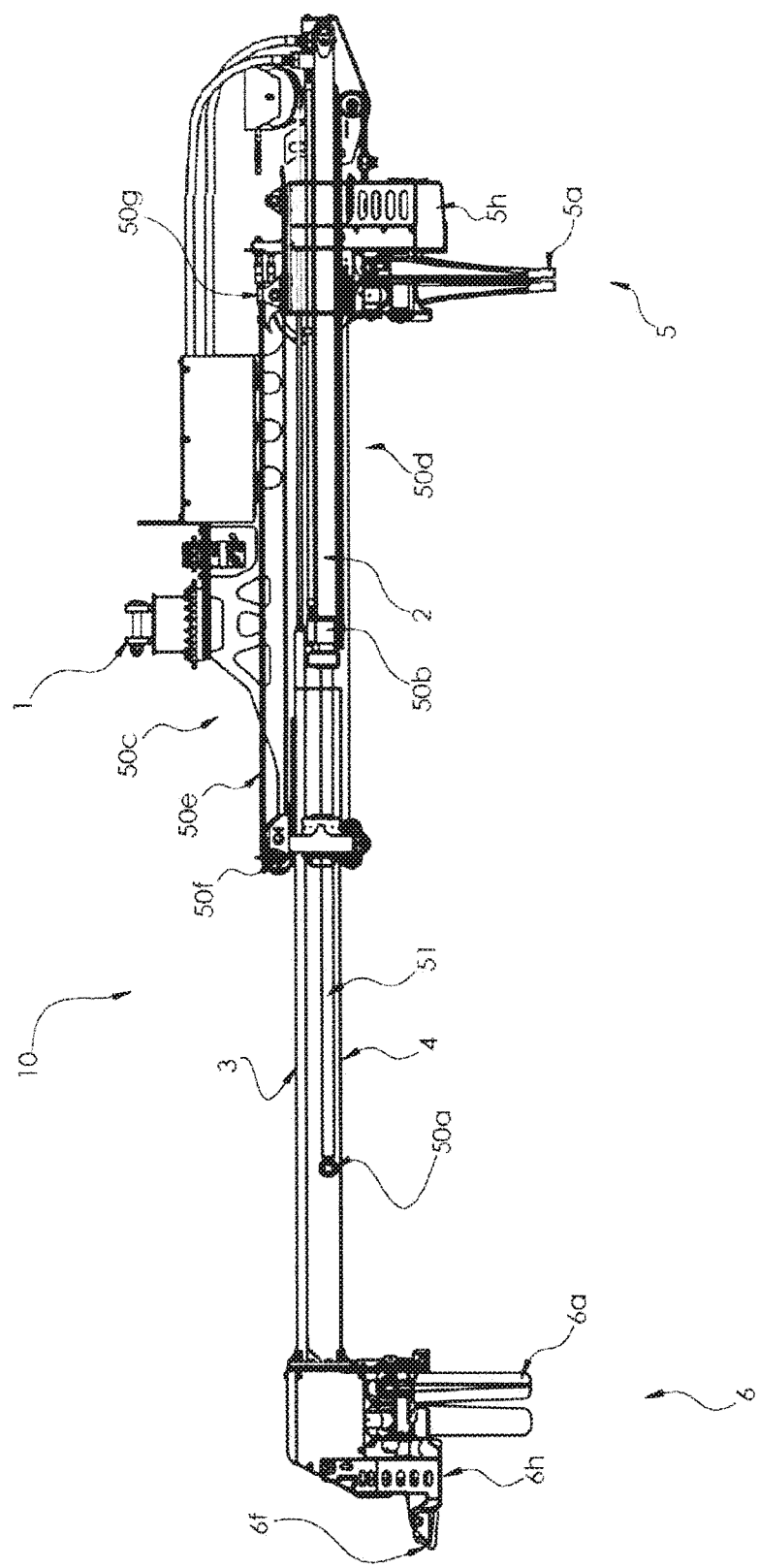
FIG. 1 is a side view of one embodiment of a tree processor (TP) in an extended position.
Figure 2:
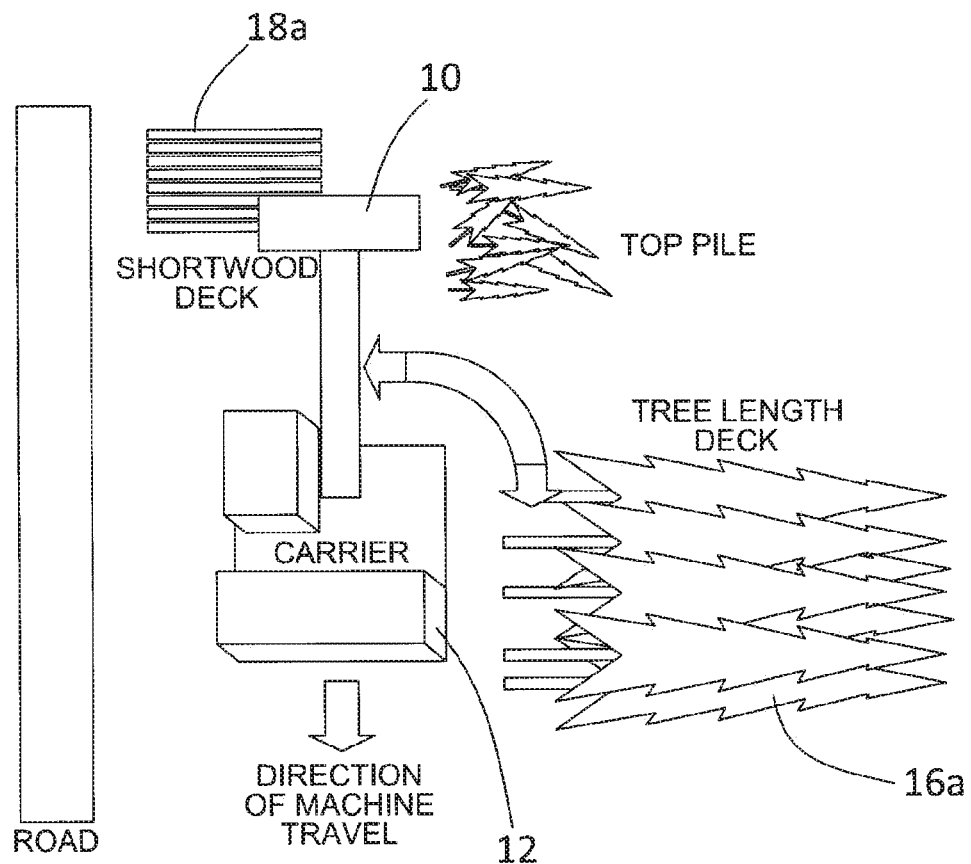
FIG. 2 is a schematic plan view of work site, showing how a deck of cut trees may be processed.
Figure 2A:
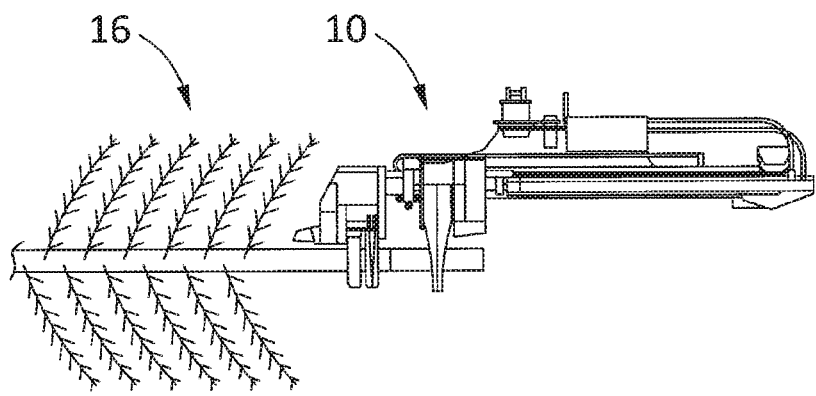
FIGS. 2A-2D are schematic diagrams of the steps a typical tree processing process using a tree processor having a forward processing head and rear processing head.
Figure 2B:
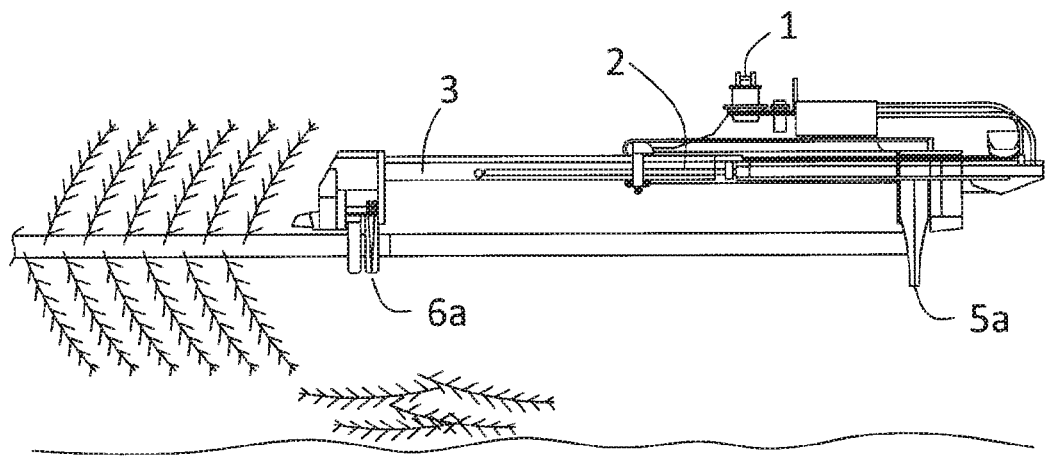
Figure 2C:
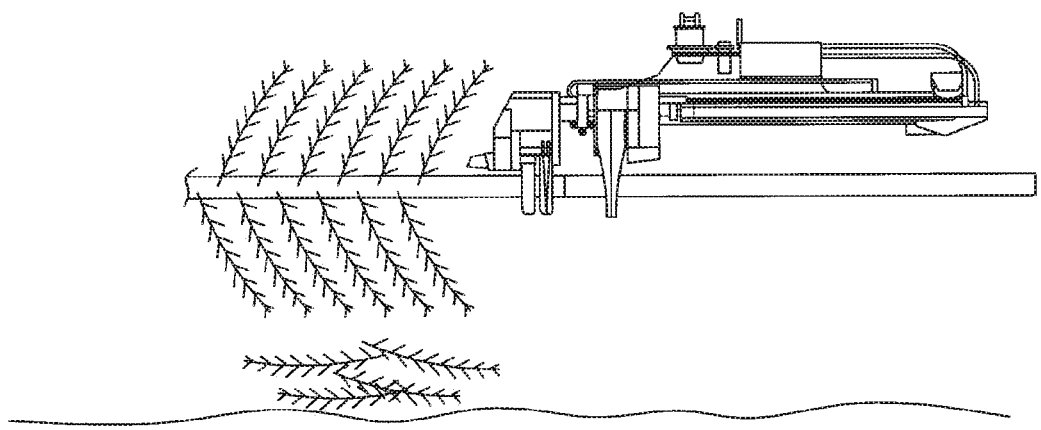
Figure 2D:
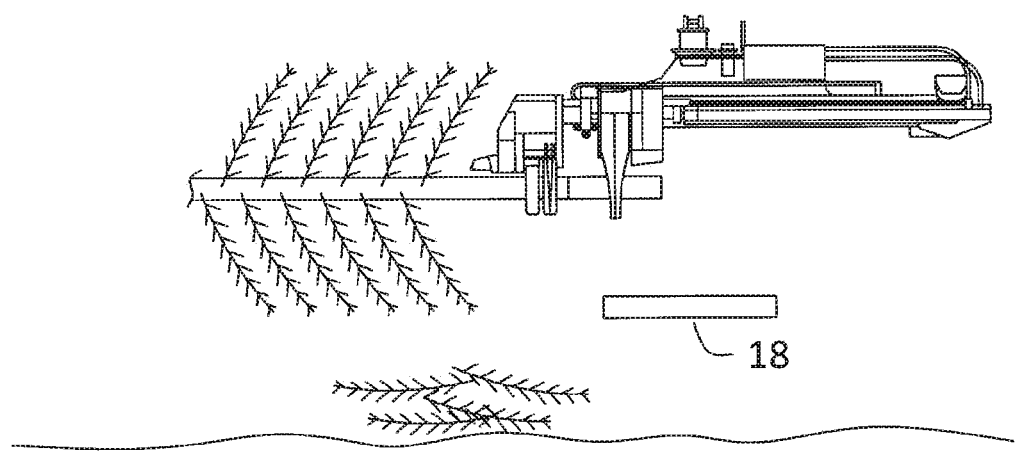

In accordance with the invention and with reference to the figures, an improved tree processing system 10 is described. FIGS. 1 and 2 show the main components of a tree processor (TP) 10 and a typical deployment scenario. As shown in FIG. 1, the TP includes a rotator system 1 for connecting the TP to carrier equipment 12 such as an excavator, a boom system including an outer boom 2, a sliding or inner boom 3, a drive system 4 for moving the booms 2, 3, a carriage 5 (also referred to herein as a rear processing head (RPH)) and a delimbing head 6 (also referred to herein as a forward processing head (FPH)).

As shown, the boom system supports the FPH and RPH and together with the drive system enables the FP and RPH to be linearly displaced with respect to one another during operation. Each of the FP and RPH includes arms 5a (referred to as grabbing arms) and 6a (referred to as delimbing arms) allowing the operator to grab and securely hold one or more harvested trees to conduct delimbing operations.

Process Overview

As shown in FIGS. 2 and 2A-2D, delimbing operations are generally conducted as follows:

FIGS. 2 and 2A-2D show schematically how a TP 10 configured to carrier equipment 12 (e.g. an excavator) at work site 14 complete a typical sequence to delimb and cut a tree stem 16 to produce a number of timber sections 18 from the tree stem. For the purposes of description, the operation of a tree processor is described for the processing of a single tree 16 using the terminology of forward and rear processing heads (FPH and RPH). As shown in FIG. 2, a TP may be configured to an excavator 12 such that the TP may be selectively moved between a pile or deck of cut trees 16a and a deck of short or processed wood 18a during which a tree is delimbed and cut to a desired length.

In step 1 (FIG. 2A), the FPH and RPH are positioned adjacent one another, that is in a retracted position, adjacent one end of a tree stem that is in the tree deck 16a. The operator aligns the TP parallel to a tree stem 16 and the FPH and RPH arms 5a, 6a are opened and positioned over and around the tree stem. The RPH grabbing arms 5a are activated to firmly grasp the tree stem and the FPH delimbing arms 6a are activated to loosely grasp the tree stem. Optionally, an indexing plate, as described in detail below may be activated prior to positioning the FPH and RPH such that the end of the tree is in a known position. The butt end of the tree may also be cut as explained in greater detail below.

In step 2 (FIG. 2B), the FPH and RPH are linearly displaced (extended) with respect to one another such that the FPH and its delimbing arms 6a are drawn over the tree stem away from the RPH to cut or break away the limbs of the tree.

In step 3 (FIG. 2C), the FPH delimbing arms are activated to firmly grasp the tree stem and the RPH grabbing arms are loosened to allow the RPH to be moved towards the FPH (retracted). This will require retraction of the indexing plate, if activated.

In step 4 (FIG. 2D), when the RPH has been advanced to a desired position, that is a desired linear length of log, the grabbing arms of the RPH are re-activated to firmly grasp the tree stem. Activation of a saw within either the FPH or the RPH will cut a section of timber from the tree stem to a desired length and, upon the arms 5a, 6a allow the timber section to fall to a desired stacking location.

Steps A-D are then repeated as necessary to advance the FPH and RPH along the tree stem to create multiple timber sections that are placed on and become the shortwood deck 18a.

Further details of the various components of the TP 10 and their functions are now described:

Rear Processing Head (RPH)

Figure 3:
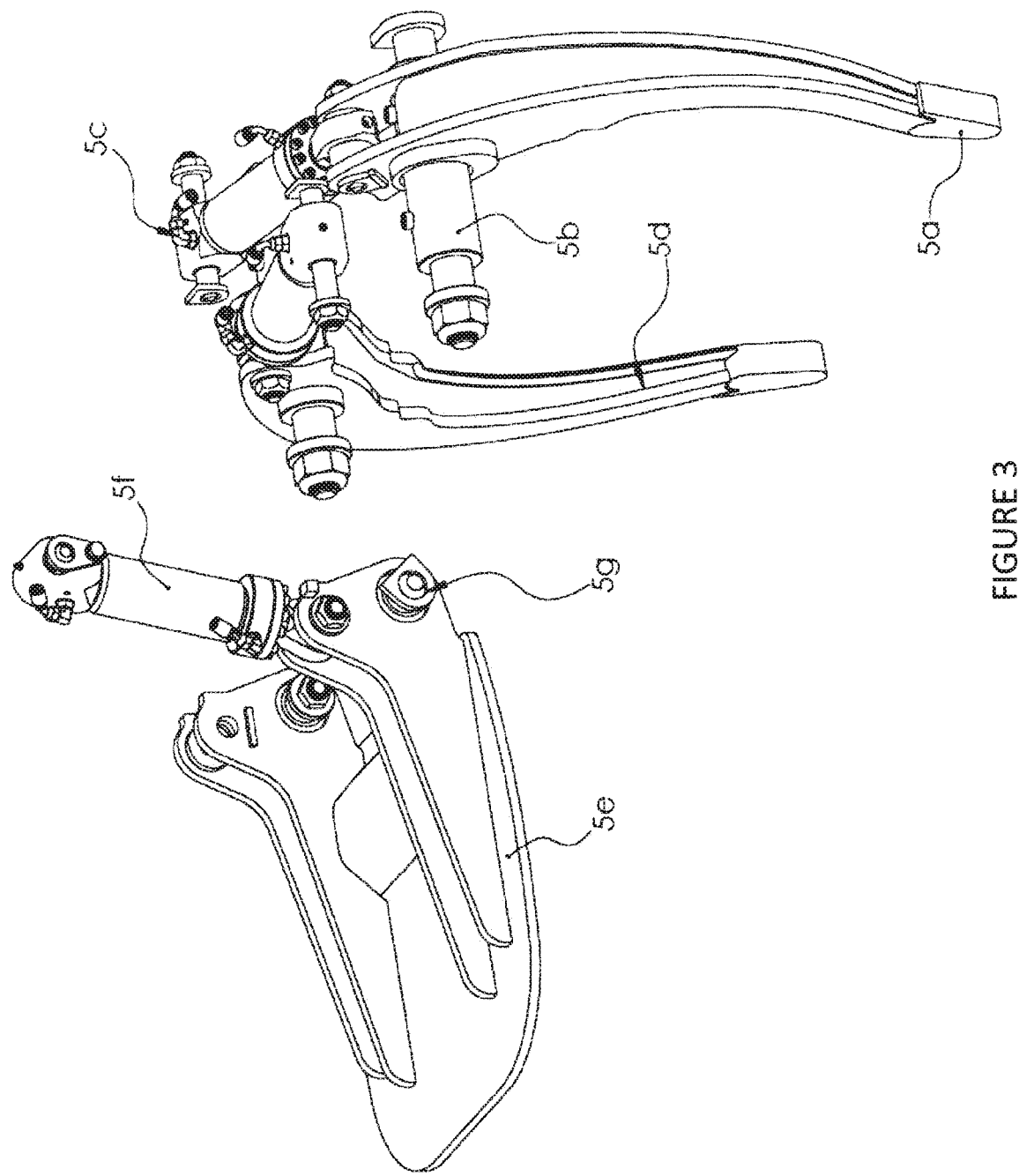
FIG. 3 is a perspective view of the grabbing arms and indexing plate and associated hydraulic actuators of a rear processing head in accordance with one embodiment of the invention.

The RPH includes an opposing pair of grabbing arms 5a for holding one or more harvested trees. As shown in FIGS. 1 and 3, the grabbing arms are a pair of opposed arcuate arms pivotally connected through pivot system 5b to the RPH. Hydraulic actuation of the grabbing arms by RPH hydraulics 5c allows the inner arcuate surface 5d of the grabbing arms to pivotally tighten against a tree stem with a radial force against the tree stem. The RPH will preferably also include an optical measurement system that measures the degree of closure of the grabbing arms so as to determine the diameter of a tree stem as described in greater detail below.

RPH Indexing Plate and Saw

In addition, the RPH preferably includes both a indexing plate 5e and saw 5h. The indexing plate is generally a flat plate pivotally connected to the RPH that may be lifted and lowered with respect to the RPH during processing operations via an indexing plate hydraulic system 5f about a pivot point 5g. Generally, the indexing plate is lowered to provide a perpendicular surface against which the butt end of a tree stem can be pressed against during the initial grabbing phase of operation. Use of the indexing plate can minimize the amount of wasted wood fiber by ensuring positioning of the butt end of the tree at a known position.

The RPH saw 5h is a saw located adjacent the indexing plate that may be activated to cut through the tree stem when the tree stem is adjacent the butt end to ensure an even wood surface at the lower end of the tree. The RPH saw can also be used to cut away damaged wood fiber at the lower end of the tree stem if present. In cases where damaged wood fiber extends some distance up the tree stem, the saw may be activated without deployment of the indexing plate.

In addition, the RPH saw is used to cut measured timber lengths from the main tree stem as described above in relation to FIG. 2D. The RPH saw is normally held in a retracted position within the RPH and will pivotally rotate from above a held tree stem through the tree stem to allow the cut timber to fall away when activated. The RPH is typically a chain saw.

Forward Processing Head

Figure 4:
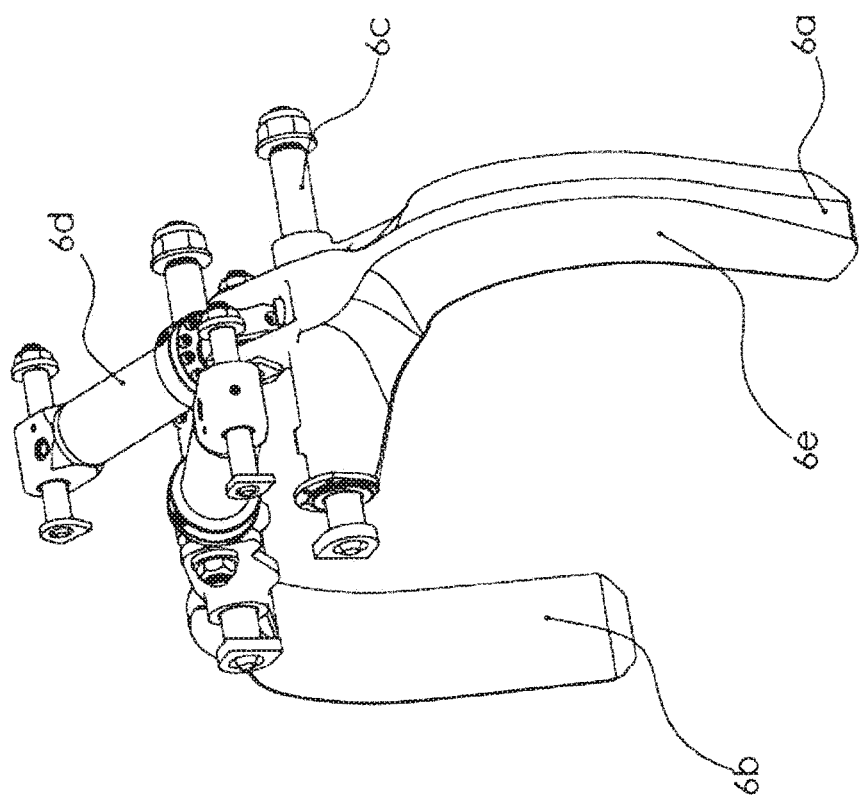
FIG. 4 is a perspective view of the delimbing arms and associated hydraulic actuators of a forward processing head in accordance with one embodiment of the invention.

As shown in FIGS. 1 and 4, the FPH 6 includes delimbing knife blades 6a that are generally aligned for axial movement with respect to the longitudinal axis of held trees. The delimbing knife blades are similar in design to the RPH grabbing arms and include opposed arcuate arms 6b pivotally connected to the FPH through pivot system 6c. Hydraulic actuation of the delimbing knife blades by hydraulic system 6d allows the inner arcuate surface of the delimbing knife blades to pivotally tighten against a tree stem with a radial force against the tree stem. The delimbing knife blades are different from the grabbing arms in that they include delimbing surfaces designed to cut/break off branches as the FPH is advanced over the tree stem. As shown in FIG. 4, the blades generally include a flat inner surface 6b that abuts adjacent to or against the tree stem and a curved outer cutting surface 6e that forms a sharp edge with the inner surface 6b that breaks/cuts branches away from the tree stem. The delimbing knife blades may have cutting surfaces on both the upstream and downstream sides of the knife blades to allow delimbing stroking in both directions that may also improve if and when branches are missed during stroking.

Moreover, in certain situations, it may be preferable for an operator to grab a tree stem at a location away from the end of the tree stem as a result of the location or size of the tree being processed and advance the FPH and RPH heads in either direction.

In one embodiment, as shown in FIGS. 1 and 5, at the forward end of the FPH, a further FPH cutting blade 6f is provided to cut branches that would otherwise impact with the FPH as the FPH is stroked over a tree stem. The FPH cutting blade has a lower flat surface 6g and a curved outer or blade surface 6h. In a preferred embodiment, the FPH cutting blade is pivotally connected to the FPH at pivot point 6i such that the cutting blade can pivotally move up and down relative to a tree stem as it is being advanced. The range of motion of the blade is sufficient to allow sufficient downward movement to engage a branch without digging in to the tree stem itself and cause damage to the tree stem fiber, generally +/−5°. Similarly, upward movement of the blade is sufficient to lift the leading edge of the blade over significant abnormalities in the tree stem. That is, the blade is preferably balanced such that it is lifted away from the tree stem when it is unloaded and is pulled down towards the tree stem as it engages with a branch.

FPH Saw

The FPH may also include a FPH saw 6j enabling an operator to cut timber following delimbing. As with the RPH, the FPH saw is preferably a chain saw (not shown) and will pivotally rotate from above a held tree stem through the tree stem to allow the cut timber to fall away. While the FPH saw is not necessarily required, it does enable greater length sections of timber to be recovered. That is, as the FPH and RPH are physically separated from one another (typically by about 3 feet), the FPH head saw allows a longer timber section to be cut from the tree and gives the operator the flexibility of deciding whether activation of the FPH saw or the RPH saw will provide the greatest efficiency in operation or fiber recovery.

Further, the FPH saw is positioned forward of the FPH gripping arms, allowing the top section of a tree stem to fall cleanly away.

Support and Drive System

As shown in FIGS. 1, 6A, 6B and 7, the boom system includes an outer boom 2 and an inner boom 3 that support the RPH and FPH. FIG. 1 shows the TP in an extended position with the RPH and FPH mounted, FIGS. 6A and 6B are simplified schematic diagrams of the boom system showing the operation of a drive system 50 of the booms, RPH and FPH during operation and FIG. 7 is a diagram of the unassembled outer and inner booms.

In a preferred embodiment, the FPH is fixed to the inner boom and the RPH is slidingly supported on the outer boom as best shown in FIGS. 6A and 6B. The drive system includes a linear actuator 51 and a chain system (50c, 50d) is configured to the inner and outer booms to mechanically multiply the linear movement of the linear actuator to move the RPH and FPH. That is, in one embodiment, the chain system is configured to the boom system in 1:2 relationship wherein 1 unit of movement of the linear actuator causes 2 units of movement of the RPH relative to the FPH. Hence, the travel speed of the FPH and RPH can be higher than the travel speed of the linear actuator.

With reference to FIGS. 6A and 6B, the drive system is described. FIG. 6A shows the boom system in the extended position with the FPH and RPH maximally separated from one another and FIG. 6B shows the boom system in the retracted position with the FPH and RPH close together.

As shown, the linear actuator has a fixed end 50a configured to the inner boom 3 and a moveable end 50b connected to the outer boom 2. Movement of the linear actuator causes the inner boom to move relative to the outer boom in a 1:1 relationship.

As noted, the RPH is slidingly mounted on the outer boom 2 and can slide along the length of the outer boom via a roller system 52. The RPH is connected to a retraction chain system 50c and an extension chain system 50d each of which pull the RPH to either the retracted or extended position as the linear actuator is retracting or is being extended.

The retraction chain system includes a retraction chain 50e and a retraction sheave 50f. A first end 50g of the retraction chain is fixed to the outer boom 2 and a second end 50h is fixed to the inner boom 3.

The extension chain system includes an extension chain 50l and an extension sheave 50i. A first end 50j of the retraction chain is fixed to the inner boom 3 and a second end 50k of the extension chain is connected to the RPH 5.

As shown in FIG. 6A, at maximum extension, the linear actuator as well as the inner and outer booms are maximally extended with respect to one another. The RPH 5 has also been fully extended to the outer end of the outer boom by extension chain. That is, as the linear actuator extends the inner and outer booms, the extension chain pulls the RPH to the outer end via the extension passing over sheave 50i.

Similarly, during retraction, as the linear actuator retracts the inner and outer booms with respect to one another, the retraction chain pulls the RPH to the inner end of the outer boom.

Importantly, the configuration as shown allows rapid extension or retraction as the action of the linear actuator is multiplied by the simultaneous movement of the RPH with respect to the outer boom.

Generally, extension is the more heavily loaded movement as extension is the movement that strips branches off the trees. Hence, the extension chain is rated for higher loads as compared to the retraction chain.

Figure 8:
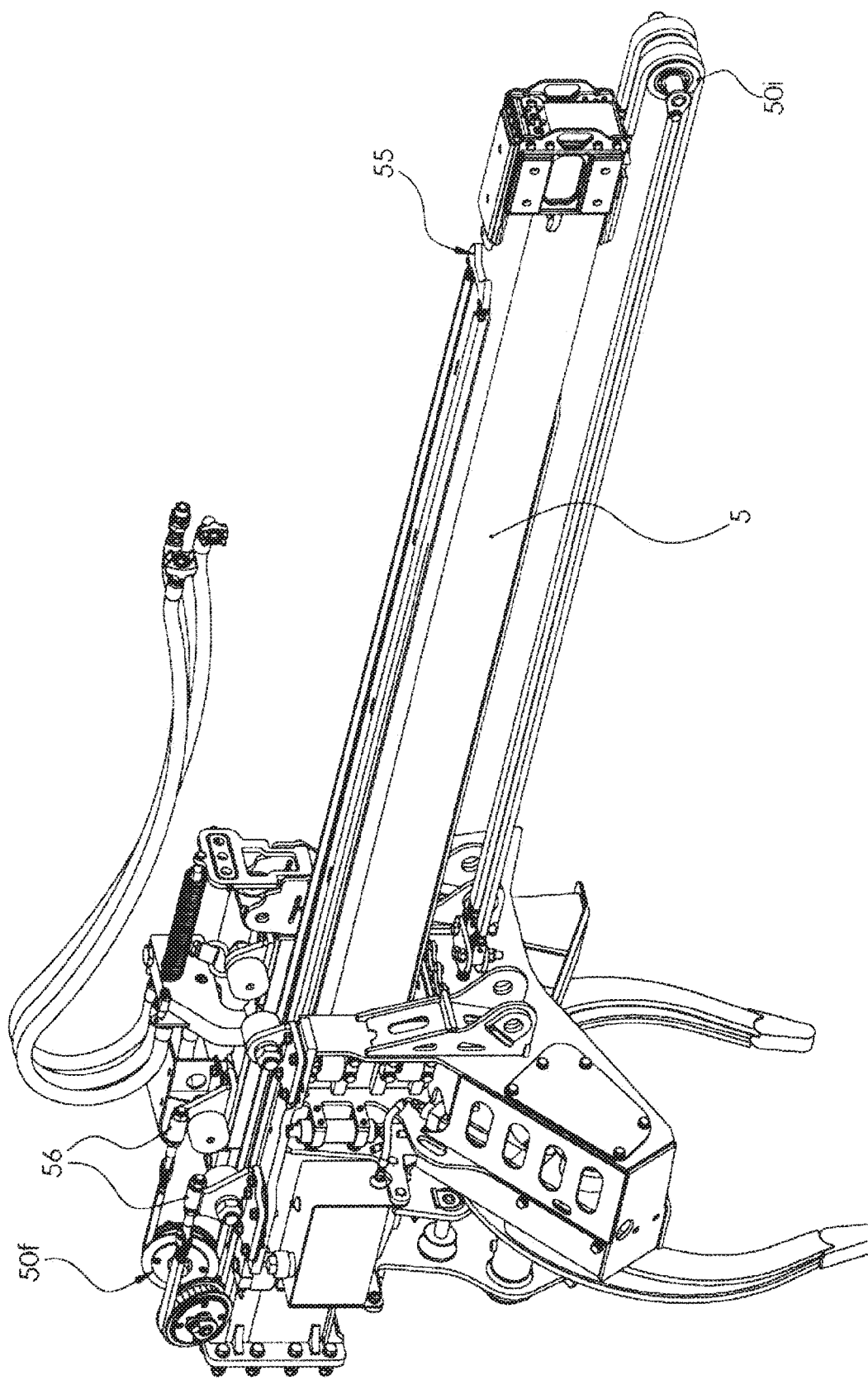
FIG. 8 is a perspective view of the rear processing head and inner boom showing details of the chain systems in accordance with one embodiment of the invention.

In one embodiment as shown in FIG. 8, a dual chain drive system is provided on both the extension and retraction chain systems. Importantly, a dual chain drive system allows for the even distribution of loads around the boom system and helps to stabilize the booms under load which can reduce wear on boom rollers. In a dual chain drive system, two chains are connected between the respective anchor points 50g, 50h, 50j, 50k and two sheaves are provided at locations 50f, 50i.

Figure 8A:
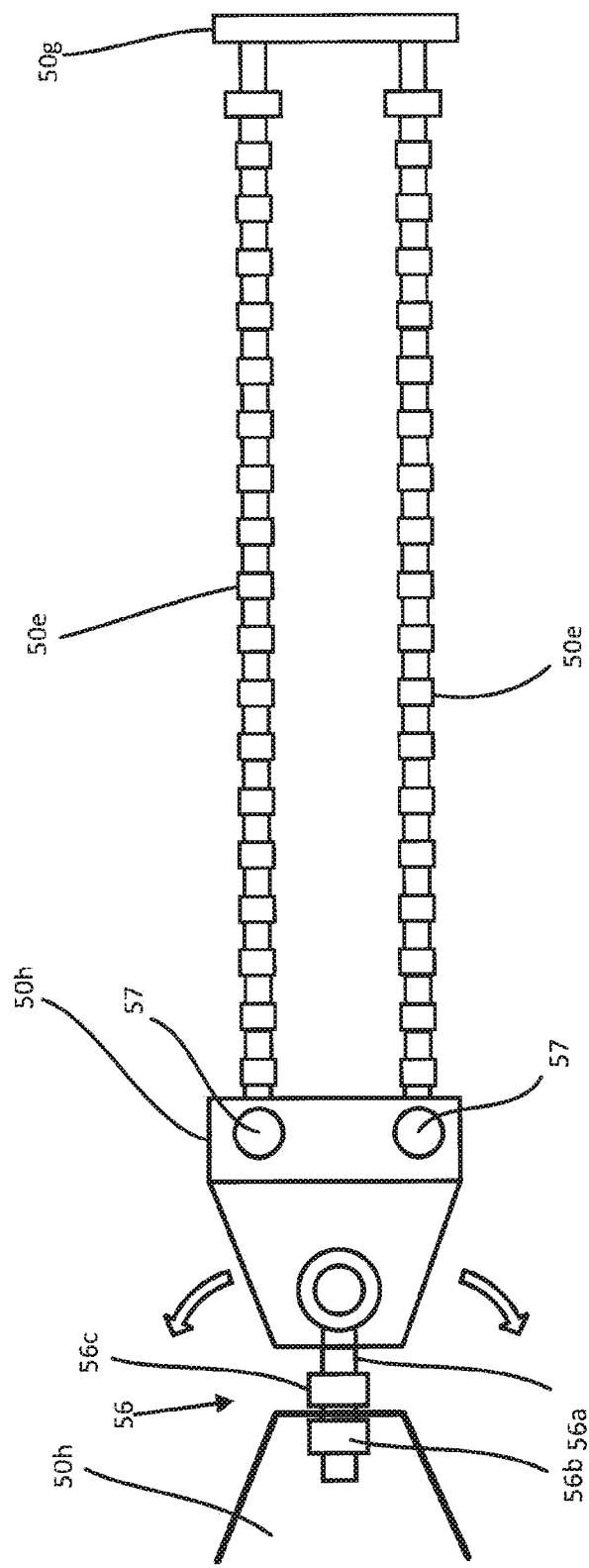
FIG. 8A is a schematic plan view of a chain tensioning system in accordance with one embodiment of the invention.

In one embodiment, the system includes a chain tensioning system as shown in FIG. 8A. In this case, one of the ends of the pair of chains is operatively connected to a chain plate 55 that is itself pivotally connected to an anchor point 50h. The ends 57 of the chains 50e are connected to a chain tensioning system 56 that is used to ensure that an even tension is applied to both chains and accommodate any varied stretching of the chains that may occur during use. For example, during use, one chain of a pair may be subjected to a greater load than its corresponding chain and may stretch to a greater extent than the other chain. As such, by providing a pivoting chain tensioning element, both chains can be tensioned evenly at the same time and to the extent that one chain stretches, the stretching can be partially accommodated by the other chain. The chain tensioning elements may be any suitable adjustment system such as an eye bolt 56a pivotally connected to the chain plate 55. The eye bolt 56a is secured and tightened against the anchor point 50h by nut 56b and lock nut 56c. The chain tensioning elements may be attached to either end of the chains.

In other embodiments, the chains may be cables.

Rotation Head

Figure 9:
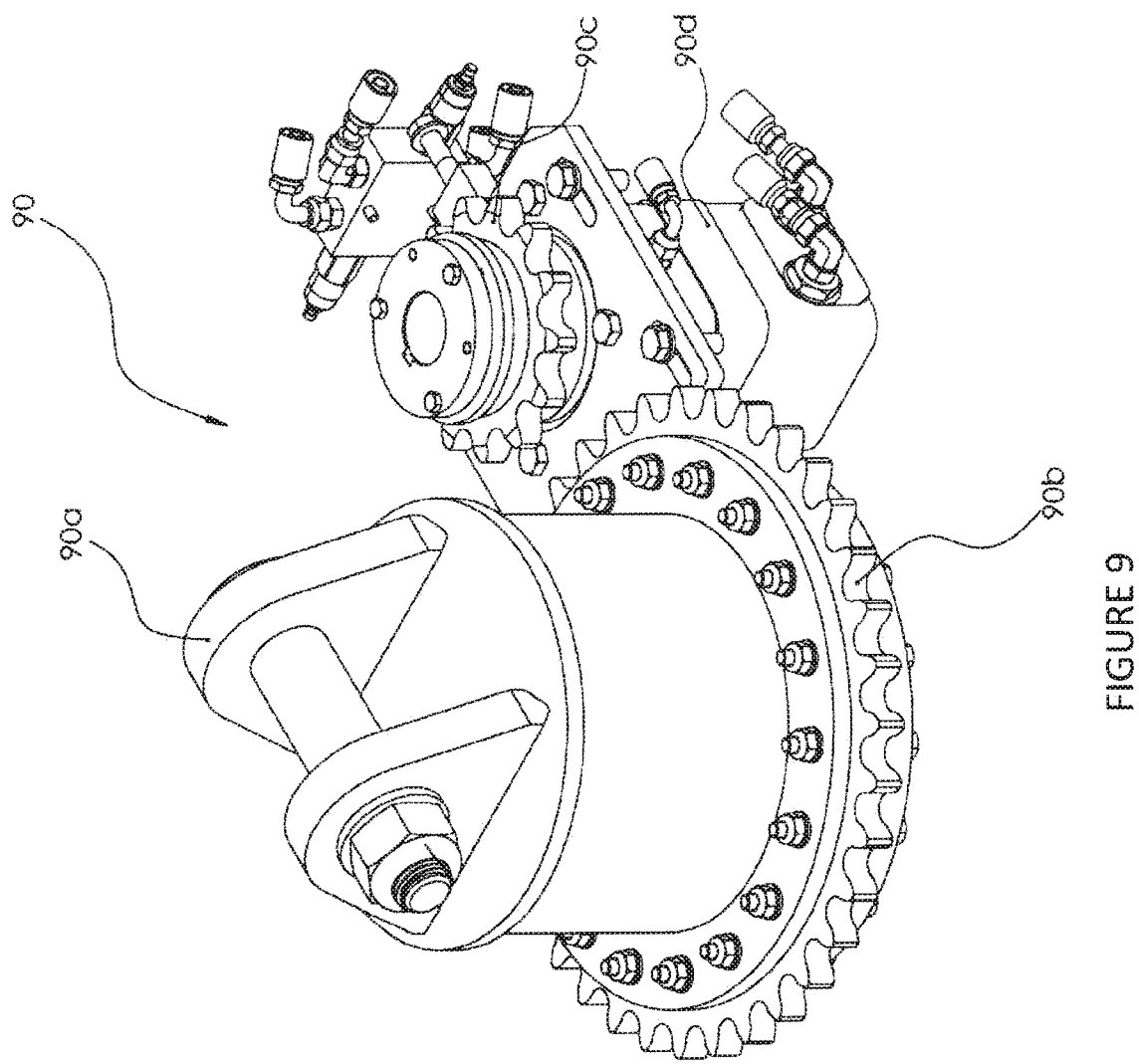
FIG. 9 is a perspective view of the rotation assembly in accordance with one embodiment of the invention.

As shown in FIG. 9, the TP includes a rotation head 90 allowing the operator to pivot the TP over one or more trees to align the FPH and RPH in order to grab and delimb the trees. Generally, the rotation head includes a mounting bracket 90a for connecting the TP to carrier equipment. The rotation head is operatively connected to the main boom through a boom mounting bracket 70 (FIG. 7). The rotation head includes a main gear 90b operatively connected via a chain (not shown) to a drive gear 90c which itself is connected to a rotation hydraulic motor 90d. The rotation head includes appropriate thrust bearings (not shown) between the mounting bracket and boom mounting bracket.

System Hydraulics

The system hydraulics are designed to ensure that rapid and effective force is delivered to each of TP sub-systems when required. Generally, the hydraulics are designed to enable the following operations:

a. Boom Feed In. This operation draws the RPH and FPH together in order to reset the RPH and FPH before a delimbing stroke. Generally, it is desirable to conduct this operation at "high" speed as the operation is simply bringing the two heads together without significant load on the system.

b. Boom Feed Out-High Speed. This operation extends the RPH and FPH with respect to one another at "high" speed but lower force. This operation is conducted when delimbing can be accomplished without the need for higher force.

c. Boom Feed Out-Low Speed, High Force. This operation extends the RPH and FPH with respect to one another at a lower speed but higher force. This operation is initiated under processing conditions where a higher force may be required against the branches to cause them to break.

d. Rotate. This operation allows the operator to pivot the TP at the connection point between the TP and excavator (rotation allowed in both directions).

e. Butt Saw Cut. This operation allows the operator to activate the saw in the RPH to cut the timber adjacent the RPH grabbing arms.

f. Grab Arms. This operation allows the operator to activate the grabbing arms (open and close) of the RPH.

g. Indexing Plate. This operation allows the operator to lower and raise the indexing plate.

h. Delimbing Knives. This operation allows the operator to open and close the delimbing knives.

i. Topping Saw Cut and Topping Saw Retract. This operation allows the operator to lower, activate and retract the FPH saw.

Preferably, and with particular consideration of the boom extension and retraction operations, the system hydraulics can be operated in different speed and force modes in order to provide the operator with flexibility in how operations are conducted. That is, under certain operating conditions, the operator may require higher force and slower processing speeds while at other times, higher speed but lower force.

Figure 10:
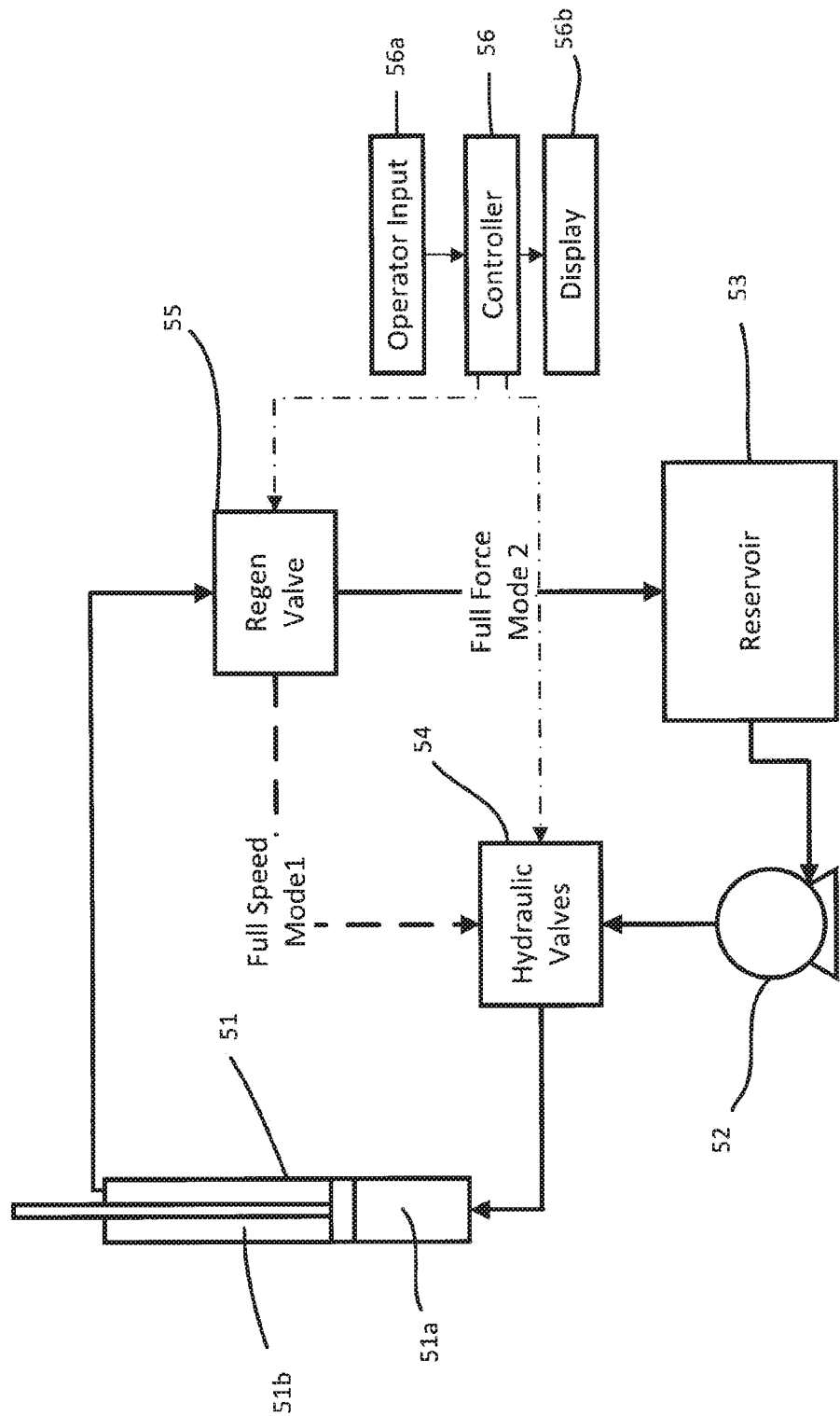
FIG. 10 is a schematic diagram showing the operation of the hydraulic system during extension of the boom system in accordance with one embodiment of the invention.

As shown in FIG. 10, the hydraulic system includes a multi-speed drive system for extending and retracting the booms 2, 3. As shown schematically, the linear actuator is a hydraulic piston 51 having a piston side 51a and rod side 51b. A hydraulic pump 52 pumps hydraulic fluid to and from a reservoir 53, through a hydraulic valve system 54 to and from the piston and rod sides of the hydraulic piston when extending and retracting the booms. As shown, the hydraulic system includes a regen valve system 55 that enables the boom extension system to operate in two modes namely Mode 1 (full speed, lower force) and Mode 2 (full force, lower speed).

In each mode, a controller 56 activates each of the regen and hydraulic valve system to control the flow of hydraulic fluid for the different extension operation conditions and also the retraction mode. The controller itself receives signals from operator input 56a and the operator can receive information from display 56b.

In Mode 1, hydraulic fluid is not returned to the reservoir from the rod side of the hydraulic piston but rather held in a closed loop under pressure. In this mode, a relatively smaller volume of hydraulic fluid is added to the closed loop as the hydraulic piston moves. As the pressure remains high in the closed loop, the piston moves at a faster rate as the fluid moves through a closed loop circulation path.

In Mode 2, hydraulic fluid is pumped from the reservoir (at atmospheric pressure) to the piston side of the hydraulic piston and through the regen valve back to the reservoir. As such, in Mode 2, as fluid leaving the rod side returns to atmospheric pressure, the pressure differential across the piston is higher and hence generates a higher force.

During the boom retraction phase, the hydraulic valve system is controlled such that fluid flow is reversed and fluid is actively pumped to the rod side of the hydraulic piston. Fluid is returned to the reservoir. During retraction, as the volume and flow of fluid is acting on the smaller area the rod side (as compared to the piston side), the speed of retraction is faster than Mode 2 extension.

Optical Measurement System

In a further embodiment, the TP includes an optical measurement system (OMS) that enables the accurate display of the linear displacement of the boom system so as to enable the operator to cut timber at a desired length. That is, it is important that an operator is both aware of the length of timber that are cutting and/or can select a length to ensure that the timbers are of desired lengths that meet mill specifications. Further, it is important that the timbers are cut at a length that does not unnecessarily waste amounts of fiber that would otherwise be cut away at the mill. Further still, it is preferable that the TP has the ability to be able to calculate the volume of wood within a specific timber which information can be used to assist the operator in meeting the specific order requirements from a mill.

Preferably, an OMS is configured to three locations on the TP:

a. A boom system OMS. Preferably, the boom system OMS is configured to the retraction chain system, such as the rotating chain sheave 50f where it may be better protected from dirt and debris. The rotation of the chain sheave is used to calculate linear displacement of the boom system. The zero position of the boom system OMS is preferably the RPH saw or indexing plate.

b. A RPH OMS. The RPH OMS is configured to each of the grabbing arms and is used to determine the diameter of timber where it is grabbed.

c. A FPH OMS. The FPH OMS is configured to each of the delimbing arms and is used to determine the diameter of timber where it is grabbed.

Each OMS generally operates by counting light pulses off a moving component relative to a stationary component and correlating pulses to a linear or arcuate distance. Each measurement can be used to calculate dimensions such as boom displacement length or timber diameter.

Control System

The control system utilizes an operator input interface enabling an operator to provide input to the system to activate the numerous functions of the TP. In one embodiment, the operator input system includes one or more joystick controls allowing X-axis and Y-axis (side-to-side and forward-backward movements of the joystick) and Z-axis (twisting movement of the joystick) to cause physical movement of the TP and/or the carrier equipment. In addition, the activation of buttons on the joysticks or other input systems can allow specific functions as described above to be completed.

Further still, the operator input system may include a take-measurement system that enables an operator to display measurement parameters of timber. For example, at the initiation of a delimbing cycle, the operator may initiate a measurement sequence where a zero measurement is taken at the butt end of the tree. In addition, the tightening of the RPH arms will determine the diameter of the tree stem at the RPH arms. At this stage, an operator may select a desired length, for example 12 feet. The controller will then extend the FPH and RPH and the controller will stop linear movement at the required position. As the delimbing arms are tightened, a measurement of the tree diameter at that location can also be taken. The combination of the linear displacement and the two diameter measurements can be used to calculate the volume of wood that may be usable according to various algorithms.

Under most operations, the FPH and RPH will advance in order that the RPH saw is used to cut the tree. However, under some conditions, where longer lengths are required and/or the operator determines that it is preferred to do so, the top saw may be activated.

In various embodiments, the controller may also be programmed to include the specific parameters of an order. In this case, as an operator works through a deck of cut trees, the controller can be calculating based on the timber measurements if the requirements of the order have been met. For example, the order may require a specific volume of wood able to supply various combinations of a number of 2×4's, 2×6's, 2×8's etc. of lengths of 8, 10 and 12 feet, etc. If the order is uploaded to the controller, as each tree is delimbed and cut to length, based on the volume measurement and algorithms, the order can be efficiently completed with reduced wastage of wood fiber due to incorrectly cut timbers.

The invention claimed is:

1. An apparatus for processing harvested trees comprising:

a grabbing head having first grabbing arms and a delimbing head having second grabbing arms, the first and second grabbing arms independently operable for grabbing the tree stem of a harvested tree, the grabbing head and delimbing head operatively mounted on a boom system enabling linear extension and retraction of the grabbing head with respect to the delimbing head and wherein the delimbing head includes a first saw system and the grabbing head includes a second saw system, the first and second saw systems independently operable to cut through a tree stem when a tree stem is held by both or either of the first and second grabbing arms; and an indexing plate pivotally connected to the boom system behind the grabbing head, the indexing plate operable between a first retracted position and a second deployed position, wherein in the deployed position, the indexing plate provides a fixed surface against which one or more tree stems may be abutted during operation.

2. The apparatus as in claim 1 wherein the first grabbing arms include a dual knife blade system, the dual knife blade system enabling delimbing during linear extension or retraction.

3. The apparatus as in claim 1 wherein the second grabbing arms include a dual knife blade system.

4. The apparatus as in claim 1 wherein the boom system includes a delimbing head boom and grabbing head boom, the delimbing head boom and grabbing head boom telescopically engaged with respect to one another, the boom system further including a dual chain drive system operatively connected to the delimbing head boom and grabbing head boom enabling telescopic extension and retraction of the delimbing head boom and grabbing head boom with respect to one other, the dual chain drive system further including a pivoting equalizer beam mounted to the boom system.

5. The apparatus as in claim 1 wherein the boom system includes a mounting and rotation system comprising a swivel bearing system for rotational connection of the boom system to a carrying system, the mounting and rotation system including a hydraulic motor and drive gear and the swivel bearing system including a driven gear operatively connected to the drive gear by a belt or chain.

6. The apparatus as in claim 1 wherein the delimbing head includes a delimbing knife pivotally connected to a forward end of the delimbing head.

7. The apparatus as in claim 1 further comprising a hydraulic drive and control system, the hydraulic drive and control system having at least two modes of operation including a full force mode and a full speed mode wherein full force mode extends the boom system with a higher force and a slower speed relative to the speed and force of full speed mode.

8. The apparatus as in claim 1 further comprising a first optical measuring system operatively connected to the boom system for measuring the linear displacement of the boom system, the first optical measuring system operatively connected to the hydraulic drive and control system for displaying the linear displacement of the boom system during operation.

9. The apparatus as in claim 8 further comprising a second optical measurement system operatively connected to one or more of the grabbing head and delimbing head for measuring the arcuate movement of the first or second grabbing arms relative to the grabbing head or delimbing head for determining the diameter of a felled tree when the first or second grabbing arms are engaged against a felled tree.

10. An apparatus for processing harvested trees comprising:

a grabbing head having first grabbing arms and a delimbing head having second grabbing arms, the first and second grabbing arms independently operable for grabbing the tree stem of a harvested tree, the grabbing head and delimbing head operatively mounted on a boom system enabling linear extension and retraction of the grabbing head with respect to the delimbing head and wherein the delimbing head includes a first saw system and the grabbing head includes a second saw system, the first and second saw systems independently operable to cut through a tree stem when a tree stem is held by both or either of the first and second grabbing arms;

an indexing plate pivotally connected to the boom system behind the grabbing head, the indexing plate operable between a first retracted position and a second deployed position, wherein in the deployed position, the indexing plate provides a fixed surface against which one or more tree stems may be abutted during operation; and, wherein each of the first grabbing arms and second grabbing arms have a dual knife blade system, the dual knife blade system for delimbing during linear extension or retraction.

11. The apparatus as claim 10 wherein the boom system includes a delimbing head boom and grabbing head boom, the delimbing head boom and grabbing head boom telescopically engaged with respect to one another, the boom system further including a dual chain drive system operatively connected to the delimbing head boom and grabbing head boom enabling telescopic extension and retraction of the delimbing head boom and grabbing head boom with respect to one other, the dual chain drive system further including a pivoting equalizer beam mounted to the boom system.

12. The apparatus as in claim 11 wherein the boom system includes a mounting and rotation system comprising a swivel bearing system for rotational connection of the boom system to a carrying system, the mounting and rotation system including a hydraulic motor and drive gear and the swivel bearing system including a driven gear operatively connected to the drive gear by a belt or chain.

13. The apparatus as claim 12 wherein the delimbing head includes a delimbing knife pivotally connected to a forward end of the delimbing head.

14. The apparatus as claim 13 further comprising a hydraulic drive and control system, the hydraulic drive and control system having at least two modes of operation including a full force mode and a full speed mode wherein full force mode extends the boom system with a higher force and a slower speed relative to the speed and force of full speed mode.

15. The apparatus as in claim 14 further comprising a first optical measuring system operatively connected to the boom system for measuring the linear displacement of the boom system, the first optical measuring system operatively connected to the hydraulic drive and control system for displaying the linear displacement of the boom system during operation.

16. The apparatus as in claim 15 further comprising a second optical measurement system operatively connected to one or more of the grabbing head and delimbing head for measuring the arcuate movement of the first or second grabbing arms relative to the grabbing head or delimbing head for determining the diameter of a felled tree when the first or second grabbing arms are engaged against a felled tree.

* * * * *